(12) United States Patent  (10) Patent No.: US 7,694,505 B2
Schilling  (45) Date of Patent: Apr. 13, 2010

(54) GAS TURBINE ENGINE ASSEMBLY AND METHOD OF ASSEMBLING SAME

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 891 days.

(21) Appl. No.: 11/461,019

(22) Filed: Jul. 31, 2006

(65) Prior Publication Data

US 2008/0022653 A1   Jan. 31, 2008

(51) Int. Cl.
    *F02K 3/02* (2006.01)
(52) U.S. Cl. .................................. 60/226.1; 60/792
(58) Field of Classification Search ................ 60/226.1, 60/792, 39.163, 793, 774, 204
See application file for complete search history.

(56) References Cited

U.S. PATENT DOCUMENTS 4,474,001 A    10/1984   Griffin et al.
4,914,904 A     4/1990   Parnes et al.
4,969,325 A    11/1990   Adamson et al.
6,619,030 B1 *  9/2003   Seda et al. .................. 60/226.1
6,625,989 B2    9/2003   Boeck
7,096,674 B2    8/2006   Orlando et al.
7,334,392 B2 *  2/2008   Moniz et al. .................. 60/204
2004/0168427 A1 9/2004   Truco et al.
2005/0210863 A1 9/2005   Wollenweber et al.
2006/0090449 A1 5/2006   Moniz et al.
2006/0090451 A1 5/2006   Moniz et al.

* cited by examiner

*Primary Examiner*—Michael Cuff
*Assistant Examiner*—Vikansha S Dwivedi
(74) *Attorney, Agent, or Firm*—William Scott Andes, Esq.; Armstrong Teasdale LLP

(57) ABSTRACT

A method of assembling a gas turbine assembly includes providing a core gas turbine engine including a high-pressure compressor, a combustor, and a turbine, coupling a low-pressure turbine axially aft from the core gas turbine engine, coupling a fan assembly axially forward from the core gas turbine engine, and coupling a booster compressor to the low-pressure turbine such that the booster compressor and the low-pressure turbine rotate at a first rotational speed.

16 Claims, 2 Drawing Sheets

GAS TURBINE ENGINE ASSEMBLY AND METHOD OF ASSEMBLING SAME

BACKGROUND OF THE INVENTION

This invention relates generally to gas turbine engines, and more specifically to gas turbine engine assemblies and methods of assembling the same.

At least some known gas turbine engines include a fan assembly, a core engine, and a low-pressure or power turbine. The core engine includes at least one compressor, a combustor, and a high-pressure turbine that are coupled together in a serial flow relationship. Air entering the core engine is mixed with fuel and ignited to form a high energy gas stream. The high energy gas stream flows through the high-pressure turbine to rotatably drive the high-pressure turbine and thus the compressor via a first drive shaft. The gas stream expands as it flows through the high-pressure turbine to facilitate driving the low-pressure turbine which rotatably drives the fan assembly through a second drive shaft.

To improve engine efficiency, it is desirable to operate the fan assembly at a relatively low speed to improve fan efficiency and to operate the high-pressure turbine at a relatively high speed to improve turbine efficiency. Accordingly, neither the fan speed nor the high-pressure turbine speed may be totally optimized to improve overall engine efficiency.

As such, at least one known gas turbine engine includes a gearbox coupled between the low-pressure turbine and the fan assembly to facilitate reducing the operational speed of the fan assembly. However, utilizing a gearbox to reduce the speed of the fan assembly and thus increase the efficiency of the fan assembly reduces the quantity of airflow channeled to the booster compressor. As a result, additional stages may be added to the booster compressor to achieve proper pressure, thus increasing the overall weight, design complexity and/or manufacturing costs of such an engine.

BRIEF DESCRIPTION OF THE INVENTION

In one aspect, a method of assembling a gas turbine engine is provided. The method includes coupling a low-pressure turbine axially aft from the core gas turbine engine, coupling a fan assembly axially forward from the core gas turbine engine, and coupling a booster compressor to the low-pressure turbine such that the booster compressor and the low-pressure turbine rotate at a first rotational speed.

In another aspect, a turbine engine assembly is provided. The turbine engine assembly includes a core gas turbine engine including a high-pressure compressor, a combustor, and a turbine. The turbine engine assembly also includes a low-pressure turbine coupled axially aft from the core gas turbine engine, a fan assembly coupled axially forward from the core gas turbine engine, and a booster compressor coupled to the low-pressure turbine such that the booster compressor and the low-pressure turbine rotate at a first rotational speed.

DETAILED DESCRIPTION OF THE INVENTION

Figure 1:
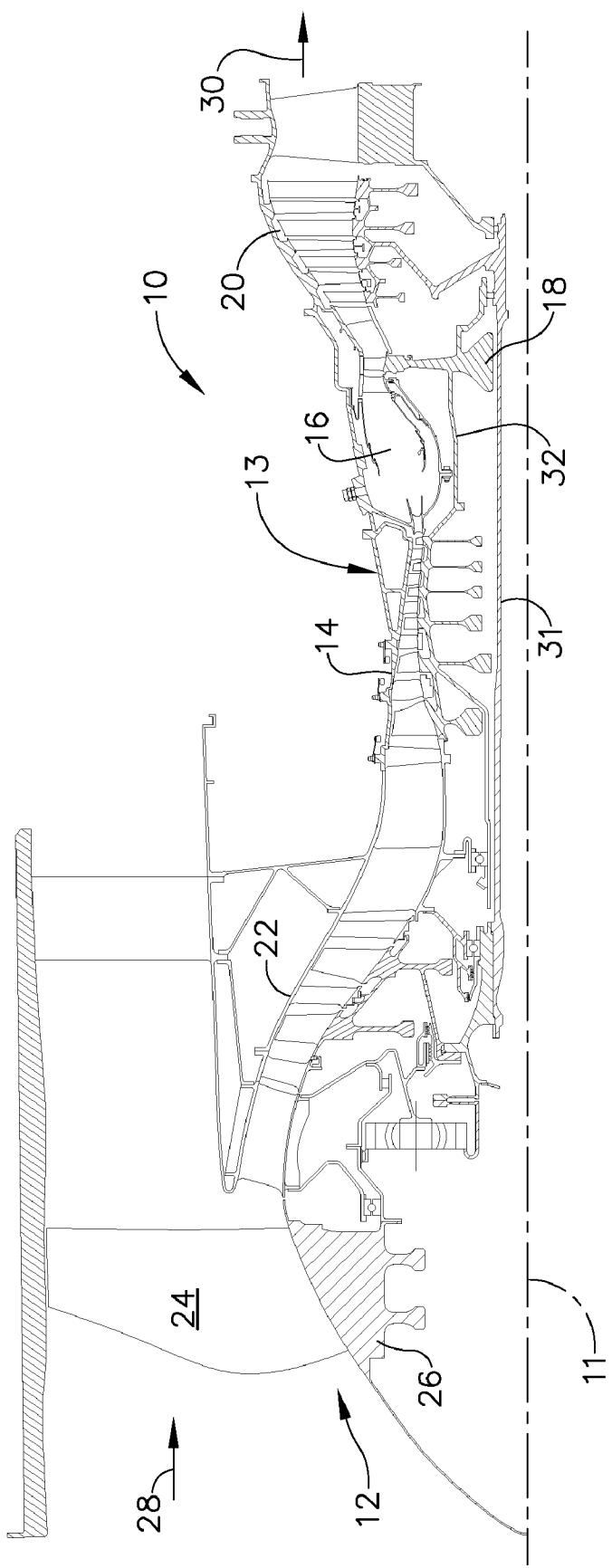
FIG. 1 is a cross-sectional view of a portion of an exemplary turbine engine assembly.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high-pressure compressor 14, a combustor 16, and a high-pressure turbine 18. In the exemplary embodiment, gas turbine engine assembly 10 also includes a low-pressure turbine 20 and a booster compressor 22.

Fan assembly 12 includes an array of fan blades 24 extending radially outward from a rotor disk 26. Engine 10 has an intake side 28 and an exhaust side 30. Booster 22 and low-pressure turbine 20 are coupled together by a first drive shaft 31, and compressor 14 and high-pressure turbine 18 are coupled together by a second drive shaft 32. Fan assembly 12 is supported on a novel frame 126 and driven by shaft 31 through reduction gearbox 100.

Figure 2:
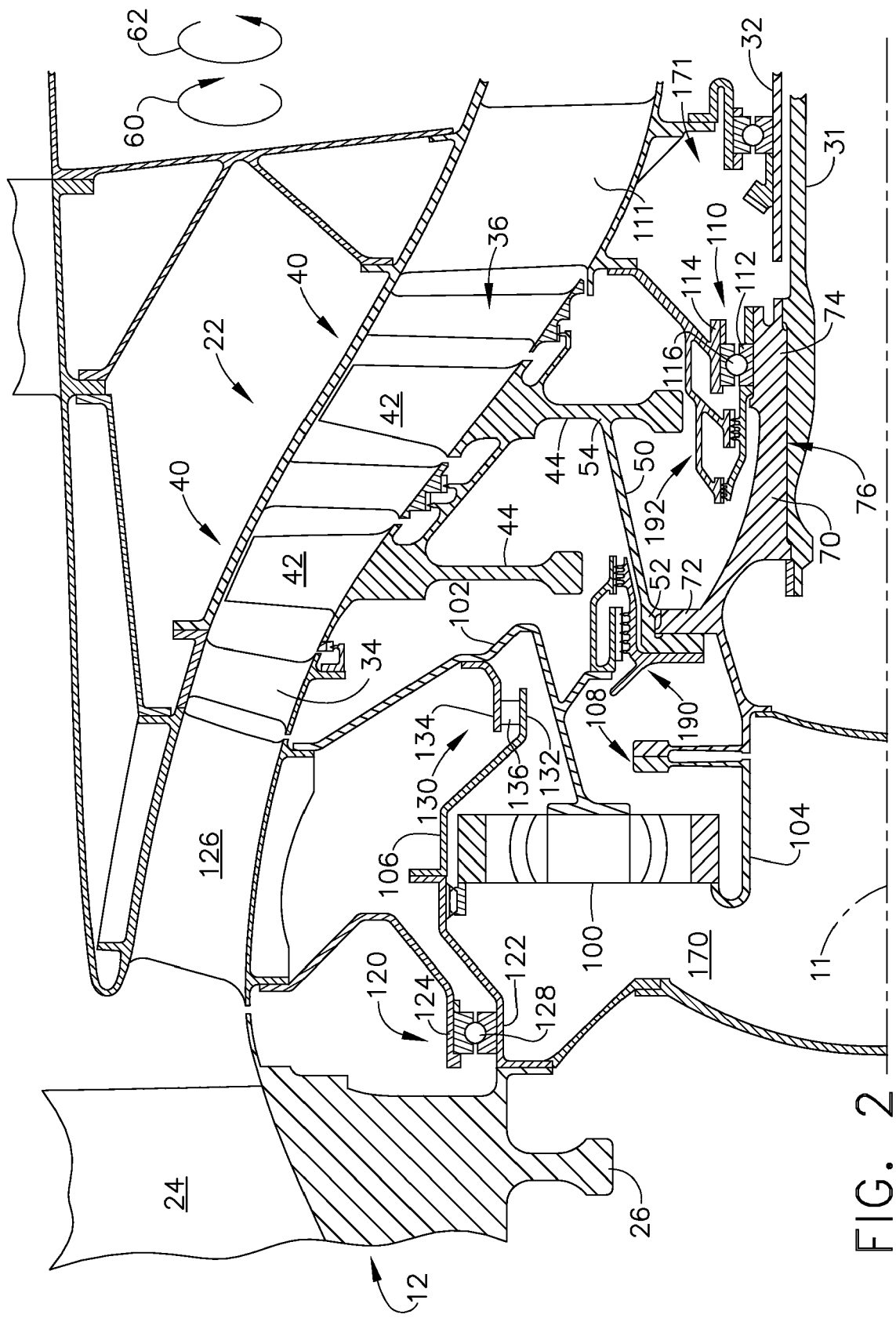
FIG. 2 is an enlarged cross-sectional view of a portion of the turbine engine assembly shown in FIG. 1.

FIG. 2 is a schematic diagram of a portion of gas turbine engine assembly 10 shown in FIG. 1. As shown in FIG. 2, booster 22 includes a plurality of circumferentially-spaced inlet guide vanes (IGV) 34 to facilitate channeling airflow entering gas turbine engine 10 downstream through booster 22. In the exemplary embodiment, gas turbine engine assembly 10 also includes a plurality of outlet guide vane (OGV) assemblies 36 that are coupled downstream from booster compressor 22. In one embodiment booster 22 includes less than four stages 40 of rotor blades 42 that are each coupled to a respective rotor disk 44. In the exemplary embodiment, booster compressor 22 includes two stages 40 of rotor blades 42.

In the exemplary embodiment, booster 22 is coupled to low-pressure turbine 20 via shaft 31. For example, in the exemplary embodiment, gas turbine engine 10 includes a cone or disk 50 that is connected at a first or forward end 52 driven by shaft 31 utilizing a plurality of splines 76, and at a second or aft end 54 to disk 44, as shown in FIG. 2. As such, booster 22 is coupled to low-pressure turbine 20 such that booster 22 and low-pressure turbine rotate at the same rotational speed in a first rotational direction 60. More specifically, gas turbine engine 10 includes a shaft extension 70 that includes a first or forward end 72 that is coupled to disk 50 and a second or aft end 74 that is coupled to drive shaft 31, and thus low-pressure turbine 20 via splines 76.

In the exemplary embodiment, gas turbine engine 10 also includes a gearbox 100 that is coupled between fan assembly 12 and drive shaft 31 to facilitate rotating fan assembly 12. In one embodiment, gearbox 100 is an epicyclical gearbox that is configured to rotate fan assembly 12 in opposite rotational direction 62 with respect to rotational direction 60 in which low-pressure turbine 20 and booster 22 each rotate. Gearbox 100 has a generally toroidal shape and is configured to be positioned circumferentially about drive shaft 31 to extend substantially about drive shaft 31. As shown in FIG. 2, gearbox 100 includes a support structure 102 that is configured to provide structural support to gearbox 100 such that gearbox 100 is maintained in a substantially fixed position within gas turbine engine 10. As such, gearbox 100 includes an input 104 that is coupled to shaft 31 via shaft extension 70 and an output 106 that is coupled to fan assembly 12 to facilitate driving fan assembly 12.

In the exemplary embodiment, gas turbine engine 10 also includes a flex connection 108 that is coupled between input 104 and shaft extension 70 to facilitate providing both axial and radial support between gearbox 100 and shaft 31. For example, during operation, flex connection 108 may absorb any rotational torque that is transmitted between gearbox 100 and shaft 31 to facilitate extending the operational life of both gearbox 100 and shaft 31. Moreover, flex connection 108 may also be utilized to facilitate aligning gearbox 100 and shaft 31 during engine operation.

In one embodiment, gearbox 100 has a gear ratio of approximately 2.0 to 1 such that fan assembly 12 rotates at a rotational speed that is approximately one-half the rotational speed of low-pressure turbine 20. As such, and in the exemplary embodiment, fan assembly 12 rotates with a rotational speed that is always slower than the rotational speed of low-pressure turbine 20.

A first bearing assembly, such as thrust bearing assembly 110, is positioned about drive shaft 31 and/or longitudinal axis 11. Thrust bearing assembly 110 operatively couples and/or is mounted between drive shaft 31 and a frame 111 of core gas turbine engine 13. Thrust bearing assembly 110 includes a radially positioned inner race 112 that is mounted with respect to drive shaft 31. As shown in FIG. 2, inner race 112 is mounted to drive shaft extension 70 operatively coupled to drive shaft 31 so that inner race 112 is rotatable about longitudinal axis 11 with drive shaft 31. Bearing assembly 110 also include a radially outer race 114 that is coupled to frame 111 and acts as a ground for the transfer of thrust loads and/or forces developed or generated by gearbox 100, and at least one roller element, such as a plurality of bearings 116 that are movably positioned between inner race 112 and outer race 114.

A second bearing assembly, such as thrust bearing assembly 120, is positioned between fan assembly 12 and gearbox output 106. As such, thrust bearing assembly 120 operatively couples fan assembly 12 to gearbox 100 and acts to ensure that thrust loads and/or forces developed or generated by fan assembly 12 are not transferred to gearbox 100. Thrust bearing assembly 120 includes a radially positioned inner race 122 that is mounted with respect to gearbox output 106 and a radially outer race 124 that is coupled to a frame 126 and acts as a ground for the transfer of thrust loads and/or forces developed or generated by fan assembly 12, and at least one roller element, such as a plurality of bearings 128 that are movably positioned between inner race 122 and outer race 124. Frame 126 carries the fan radial, thrust, and overturning moment generated from bearing 128 and 136. Frame 126 also transfers these loads to the outer engine structure and mounts. By use of frame 126, frame 111 can be minimized with respect to its' overall axial dimensions thus minimizing weight of the engine system As a result of transferring thrust loads and/or forces to thrust bearing assembly 120, the transfer of thrust loads and/or forces through gearbox 100, operatively coupled to fan assembly 12, is prevented or limited. In alternative embodiments, any suitable bearing assembly known to those skilled in the art and guided by the teachings herein provided can be used for, or in addition to, bearing assembly 110 and/or bearing assembly 120.

To facilitate maintaining gearbox output 106 is a substantially fixed radial position, gas turbine engine assembly 10 also include a roller bearing assembly 130 that is coupled between gearbox output 106 and support structure 102. Specifically, bearing assembly 130 includes a rotating inner race 132 that is coupled to gearbox output 106, a stationary inner race that is coupled to support structure 102, and a plurality of roller elements 136 that are positioned between inner and outer races 132 and 134, respectively.

In the exemplary embodiment, thrust bearing assembly 120 and roller bearing assembly 130 facilitate providing rotational support to fan assembly 12 such that fan assembly 12 and gearbox output 106 may rotate freely with respect to support structure 102 and 106. Accordingly, bearing assemblies 120 and 130 facilitate maintaining fan assembly 12 in a relatively fixed radial position within gas turbine engine assembly 10.

In the exemplary embodiment, gas turbine engine assembly 10 also includes a first pair of labyrinth seals 190 that facilitate sealing an upstream side of booster 22 from sump 170, and a second pair of labyrinth seals 192 that facilitate sealing a downstream side of booster 22 from sump 171.

To assemble gas turbine engine 10, a core gas turbine engine including a high-pressure compressor, a combustor, and a turbine is provided. A low-pressure turbine is coupled axially aft from the core gas turbine engine, and a fan assembly is coupled axially forward from the core gas turbine engine. The booster compressor is then coupled to the low-pressure turbine such that the booster compressor and the low-pressure turbine rotate at a first rotational speed.

More specifically, a drive shaft is coupled to the low-pressure turbine, and a gearbox coupled between the drive shaft and the fan assembly such that the fan assembly rotates at a second rotational speed that is different and/or less than the first rotational speed. To facilitate absorbing thrust loads, a first thrust bearing assembly is coupled between the drive shaft and the gearbox such that the thrust loads generated by the gearbox are transferred to ground, and a second thrust bearing assembly between the gearbox and the fan assembly such that the thrust loads generated by the fan assembly are transferred to ground.

During operation, as drive shaft 31 rotates, drive shaft extension 70 causes gearbox input 104 to rotate in first rotational direction 60, which subsequently rotates gearbox output 106 in opposite second rotational direction 62. Because gearbox output 106 is coupled to fan assembly 12, drive shaft 31 causes fan assembly 12 to rotate via gearbox 100 in opposite second direction 62, i.e. in an direction that is opposite from the rotational directions of both low-pressure turbine 20 and booster 22. In one embodiment, gearbox 100 is located within a sump 170 such that lubrication fluid within the sump may be utilized to lubricate at least portions of gearbox 100. For example, during operation, gearbox 100 is continuously lubricated within sump 170.

The gas turbine engine assembly described herein includes a booster compressor that is coupled directly to the low-pressure turbine via a drive shaft to enable the booster compressor to operate at a rotational speed that is greater than the rotational speed of the fan assembly. Moreover, that gas turbine engine assembly includes a gearbox coupled between the low-pressure turbine and the fan assembly. As a result, the rotational speeds of both the fan assembly and the booster compressor can be optimized. Specifically, the speed of the fan assembly can be reduced to optimize the airflow produced by the fan assembly, and the speed of the booster compressor can be increased to optimize the booster compressor stage count and drive the turbine stage count lower. As a result, the fan booster is driven at the low-pressure turbine speed thus reducing booster stage count and increasing turbine efficiency which may be used for power extraction in an electric accessory aircraft.

Exemplary embodiments of a gas turbine engine assembly and methods of assembling the gas turbine engine assembly are described above in detail. The assembly and method are not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

1. A method of assembling a gas turbine engine assembly, said method comprising:
   providing a core gas turbine engine including a high-pressure compressor, a combustor, and a turbine;
   coupling a low-pressure turbine axially aft of the core gas turbine engine;
   coupling a fan assembly axially forward of the core gas turbine engine; and
   coupling a booster compressor to the low-pressure turbine; and coupling the fan assembly to the booster compressor via a gearbox and a drive shaft such that, upon rotation of the drive shaft in a first rotational direction, the booster compressor and the low-pressure turbine rotate in the first rotational direction at a first rotational speed and the fan assembly rotates in a second rotational direction at a second rotational speed, the first rotational direction different than the second rotational direction, the first rotational speed greater than the second rotational speed.

2. A method in accordance with claim 1 further comprising:
   wherein coupling the fan assembly to the booster compressor via a gearbox comprises coupling the gearbox between the driveshaft and the fan assembly.

3. A method in accordance with claim 2 further comprising coupling a first thrust bearing assembly between the drive shaft and the gearbox such that thrust loads generated by the low-pressure turbine and the booster compressor are transferred to ground.

4. A method in accordance with claim 2 further comprising coupling a second thrust bearing assembly between the gearbox and the fan assembly such that thrust loads generated by the fan assembly are transferred to ground.

5. A method in accordance with claim 2 wherein coupling a gearbox further comprises providing the gearbox with a substantially toroidal cross-sectional profile between the fan assembly and the drive shaft such that the gearbox substantially circumscribes the drive shaft.

6. A method in accordance with claim 1 further comprising:
   coupling a gearbox to the fan assembly; and
   coupling a flex connection between the drive shaft and the gearbox.

7. A method in accordance with claim 1 wherein coupling a booster compressor to the low-pressure turbine further comprises coupling the booster compressor to the low-pressure turbine with the booster compressor including a predetermined quantity of compressor stages that is based on a compression ratio of the fan assembly and an overall compression ratio of the gas turbine engine assembly.

8. A method in accordance with claim 1 wherein coupling a booster compressor to the low-pressure turbine further comprises providing the booster compressor with less than four booster stages.

9. A turbine engine assembly comprising:
   a core gas turbine engine comprising a high-pressure compressor, a combustor, and a high-pressure turbine;
   a low-pressure turbine coupled axially aft of said core gas turbine engine;
   a fan assembly coupled axially forward of said core gas turbine engine; and
   a booster compressor coupled to said low-pressure turbine; and a fan assembly coupled to a booster compressor via a gearbox and drive shaft such that, upon rotation of said drive shaft in a first rotational direction, said booster compressor and said low-pressure turbine rotate in the first rotational direction at a first rotational speed and said fan assembly rotates in a second rotational direction at a second rotational speed, the first rotational direction different than the second rotational direction, the first rotational speed greater than the second rotational speed.

10. A turbine engine assembly in accordance with claim 9 wherein said gearbox is coupled between
    said drive shaft and said fan assembly.

11. A turbine engine assembly in accordance with claim 10 further comprising a first thrust bearing assembly coupled between said drive shaft and said gearbox and configured to transfer thrust loads generated by said low-pressure turbine and said booster compressor to ground.

12. A turbine engine assembly in accordance with claim 10 further comprising a second thrust bearing assembly coupled between said gearbox and said fan assembly and configured to transfer thrust loads generated by said fan assembly to ground.

13. A turbine engine assembly in accordance with claim 10 wherein said gearbox has a substantially toroidal cross-sectional profile and substantially circumscribes said drive shaft.

14. A turbine engine assembly in accordance with claim 10 further comprising a frame configured to support said fan assembly and said gearbox, said frame configured to carry said fan assembly radial, thrust, and overturning moment to an outer engine structure and mounts.

15. A turbine engine assembly in accordance with claim 9 further comprising:
    a flex connection coupled between said drive shaft and said gearbox.

16. A turbine engine assembly in accordance with claim 9 wherein said booster compressor comprises a predetermined quantity of compressor stages that is based on a compression ratio of said fan assembly and an overall compression ratio of said gas turbine engine assembly.

\* \* \* \* \*